(12) United States Patent
Malm

(10) Patent No.: US 8,978,627 B2
(45) Date of Patent: Mar. 17, 2015

(54) METHOD AND APPARATUS FOR CAPTURING AND CONTROLLING FUGITIVE GASES

(75) Inventor: Howard Leigh Malm, Coquitlam (CA)

(73) Assignee: Rem Technology, Inc., Calgary, Alberta (CA)

( * ) Notice: Subject to any disclaimer, the term of this patent is extended or adjusted under 35 U.S.C. 154(b) by 0 days.

(21) Appl. No.: 13/353,251

(22) Filed: Jan. 18, 2012

(65) Prior Publication Data
US 2012/0180766 A1 Jul. 19, 2012

Related U.S. Application Data

(60) Division of application No. 11/877,085, filed on Oct. 23, 2007, now Pat. No. 8,113,181, which is a continuation-in-part of application No. 11/078,905, filed on Mar. 9, 2005.

(51) Int. Cl.
| | |
|---|---|
| F02B 43/00 | (2006.01) |
| F02B 43/10 | (2006.01) |
| F02B 43/12 | (2006.01) |
| F02C 3/22 | (2006.01) |
| F02C 7/22 | (2006.01) |
| F02M 25/08 | (2006.01) |
| F23G 5/50 | (2006.01) |
| F23G 7/06 | (2006.01) |
| F02D 19/06 | (2006.01) |
| F02D 19/08 | (2006.01) |
| F02M 21/02 | (2006.01) |

(52) U.S. Cl.
CPC .................. *F02B 43/10* (2013.01); *F02B 43/12* (2013.01); *F02C 3/22* (2013.01); *F02C 7/22* (2013.01); *F02M 25/089* (2013.01); *F23G 5/50* (2013.01); *F23G 7/065* (2013.01); *F02D 19/0642* (2013.01); *F02D 19/081* (2013.01); *F02M 21/0215* (2013.01); *F23G 2206/202* (2013.01); *Y02T 10/36* (2013.01); *Y02T 10/32* (2013.01)
USPC .......................................................... 123/527

(58) Field of Classification Search
CPC F02M 25/08; F02M 25/0836; F02M 25/0872
USPC ......... 123/572, 575, 517, 527, 529, 531, 698, 123/518, 519, 520, 27 R, 27 GE
See application file for complete search history.

(56) References Cited

U.S. PATENT DOCUMENTS

| | | | | |
|---|---|---|---|---|
| 4,475,522 A | * | 10/1984 | Oonaka | 123/520 |
| 4,495,904 A | * | 1/1985 | Sakaino et al. | 123/179.16 |
| 4,527,532 A | * | 7/1985 | Kasai et al. | 123/520 |
| 5,103,794 A | * | 4/1992 | Shiraishi | 123/520 |
| 5,657,734 A | * | 8/1997 | Sawamoto et al. | 123/519 |
| 5,699,778 A | * | 12/1997 | Muraguchi et al. | 123/698 |
| 5,755,210 A | * | 5/1998 | Sato et al. | 123/518 |

FOREIGN PATENT DOCUMENTS

JP 59058143 A * 4/1984 ............. F02M 25/08

* cited by examiner

*Primary Examiner* — Hung Q Nguyen
(74) *Attorney, Agent, or Firm* — John Russell Uren

(57) ABSTRACT

A method of providing fugitive gases to an engine air supply. An air filter is positioned on the engine intake of said engine. The air filter creates a negative pressure in the engine intake downstream of the air filter. A source of fugitive gases pass to the engine intake and are collected by the negative pressure downstream of the air filter.

1 Claim, 16 Drawing Sheets

| LOCATION | | DEVICE | FLOW-MEASURED | FLOW DEDUCED (GAS) |
|---|---|---|---|---|
| Instrument gas vent (control cabinet) | $V_4$ | Rotameter | 6.2 scf/m (air) | 7.7 scf/m (gas) |
| 546 I/P used for fuel valve | $V_3$ | Rotameter | <2 scf/m (air) | 0.6 scf/m (specs) |
| Compressor packing | $V_1$ | Micromotion | <0.5 lb/h | 0.7 scf/m (est) |
| Starter and blow-down vent | $V_2$ | Not measured | | |
| Total | | | | 9 scf/m |

| Step | A | B | C | Flow |
|---|---|---|---|---|
| 0 | Closed | Closed | Closed | 0% |
| 1 | Open | Closed | Closed | 14% |
| 2 | | Open | Closed | 28% |
| 3 | Open | Open | Closed | 43% |
| 4 | Closed | Closed | Open | 57% |
| 5 | Open | Closed | Open | 71% |
| 6 | Closed | Open | Open | 86% |
| 7 | Open | Open | Open | 100% |

# METHOD AND APPARATUS FOR CAPTURING AND CONTROLLING FUGITIVE GASES

CROSS-REFERENCE TO RELATED APPLICATIONS

This is a divisional of application Ser. No. 11/877,085 filed Oct. 23, 2007, entitled IMPROVED METHOD AND APPARATUS FOR CAPTURING AND CONTROLLING FUGITIVE GASES, currently pending, which was a continuation-in-part of application Ser. No. 11/078,905 filed Mar. 9, 2005, currently pending, and entitled METHOD AND APPARATUS FOR UTILIZING FUGITIVE GASES AS A SUPPLEMENTARY FUEL SOURCE.

INTRODUCTION

This invention relates to techniques used for controlling fugitive gases used as a supplemental fuel source for an engine and, more particularly, to techniques used to control engine speed when the supply of fugitive gases varies in composition and flow and where the engine may be other than an ordinary aspirated engine.

BACKGROUND OF THE INVENTION

Engines, turbines and heating units using natural gas and other gaseous fuels are known and are used extensively, particularly in locations where natural gas production takes place. Such engines and turbines range from 30 HP to over 10000 HP and may conveniently be used in powering gas compressors, pumps and electric generators and which powered equipment is normally associated with natural gas production. The heating units are used in a wide range of industrial processes. The natural gas or other gaseous fuel is introduced directly to the cylinder of the natural gas engine or to the intake manifold. A spark ignitor is typically used to ignite the combustible natural gas and an air supply adds the air necessary to support the combustion.

The gaseous fuel used for such engines, turbines or heating units comes from a fuel source such as natural gas and the air to support the combustion of the gas comes from the atmosphere. Normally, the gaseous fuel is under pressure and appropriate ducting extends from the pressurized fuel supply to the engine. A carburetor, valves or an electronic control mechanism is used to regulate the quantity of natural gas provided to the engine and the quantity of air added to the natural gas for efficient combustion.

Various production processes in natural gas production result in losses of combustible gases. Such gaseous losses typically occur from compressors, particularly where the packing is old or otherwise deficient, from pneumatic instrumentation utilising natural gas, from initiating or starting engine procedure using natural gas, from gas dehydration units, from engine crankcases and from petroleum liquid storage tanks. These gas losses, typically called "fugitive and/or vent emissions", are usually passed to the atmosphere or to a stack for burning. In either case, they are lost and the energy content of these gases which can be considerable, is similarly lost. It is disadvantageous and energy deficient to lose these fugitive or vent gases.

It is known to use natural gas as a supplementary fuel for a diesel engine by adding natural gas to the intake air. This natural gas, however, is not a fugitive or vent gas and the gas is maintained under pressure as a normal fuel source. The use of such fuel does not lower costs by using a fuel normally lost or deliberately discarded and such a fuel is not an emission resulting from venting or escaping gas. Fugitive gases have been collected and used as a fuel source but such gases have been collected and put under pressure. Such gases are not used as a supplementary fuel source.

SUMMARY OF THE INVENTION

According to the invention, there is provided a method of providing fugitive gases to an engine air supply comprising positioning an air filter on the engine intake of said engine, allowing said air filter to create a negative pressure in said engine intake downstream of said air filter, providing a source of fugitive gases to pass to said engine intake and allowing said fugitive gases to be collected by said negative pressure downstream of said air filter.

According to a further aspect of the invention, there is provided a source of fugitive gases to supply an engine with supplemental fuel, a vent to allow said fugitive gases to pass to the atmosphere and a duct fan positioned in a fugitive gas supply pipe providing said fugitive gases to said engine, said duct fan allowing said fugitive gases to be drawn into said duct fan and passed to the air intake of said engine.

According to yet a further aspect of the invention, there is provided a source of fugitive gases to supply an engine with a supplemental fuel supply, an air intake duct to supply air to said engine and a venturi within said air intake duct to provide a negative pressure downstream of said venturi within said air intake duct, said negative pressure within said air intake duct being operable to draw said fugitive gases from said fugitive gas source into said air intake duct and to said engine.

According to still yet a further aspect of the invention, there is provided a source of fugitive gases for an engine which fugitive gases are used as a supplemental fuel supply for said engine, a high pressure fuel gas to provide fuel for said engine, an eductor to reduce the pressure of said high pressure fuel gas and to collect said fugitive gases and a fuel control valve operable by a governor to increase or decrease the supply of said high pressure fuel gas, said eductor further creating a low pressure for the intake of said fugitive gases into said fuel supply for said engine.

According to yet a further aspect of the invention, there is provided an accumulator for storing excessive volumes of fugitive gas flow used as a fuel source for an engine, said accumulator being positioned within ducting between said source of fugitive gases and the intake of said engine.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

The terms "fugitive gases" or "fugitive combustible gases" or "fugitive emissions" or "fugitive gases" or "vent gases" or "vent emissions" are used throughout this specification. The terms are used interchangeably and, by the use of such terms, it is intended to include combustible gases which escape from various apparatuses or which are released deliberately into the atmosphere. Such combustible gases normally exist at or near atmospheric pressure in the vicinity of the sources from where they originate. These fugitive gases are intended to be collected and to be used as a supplementary fuel supply for an engine which, conveniently, uses natural gas as its primary fuel supply and which natural gas is pressurized before entering the engine. The various apparatuses from which the fugitive gases may escape include compressor cylinder packings, instruments, starting gas sources for the engine, gas dehydration units, crankcases, petroleum liquid storage tanks and the like.

Figure 1:
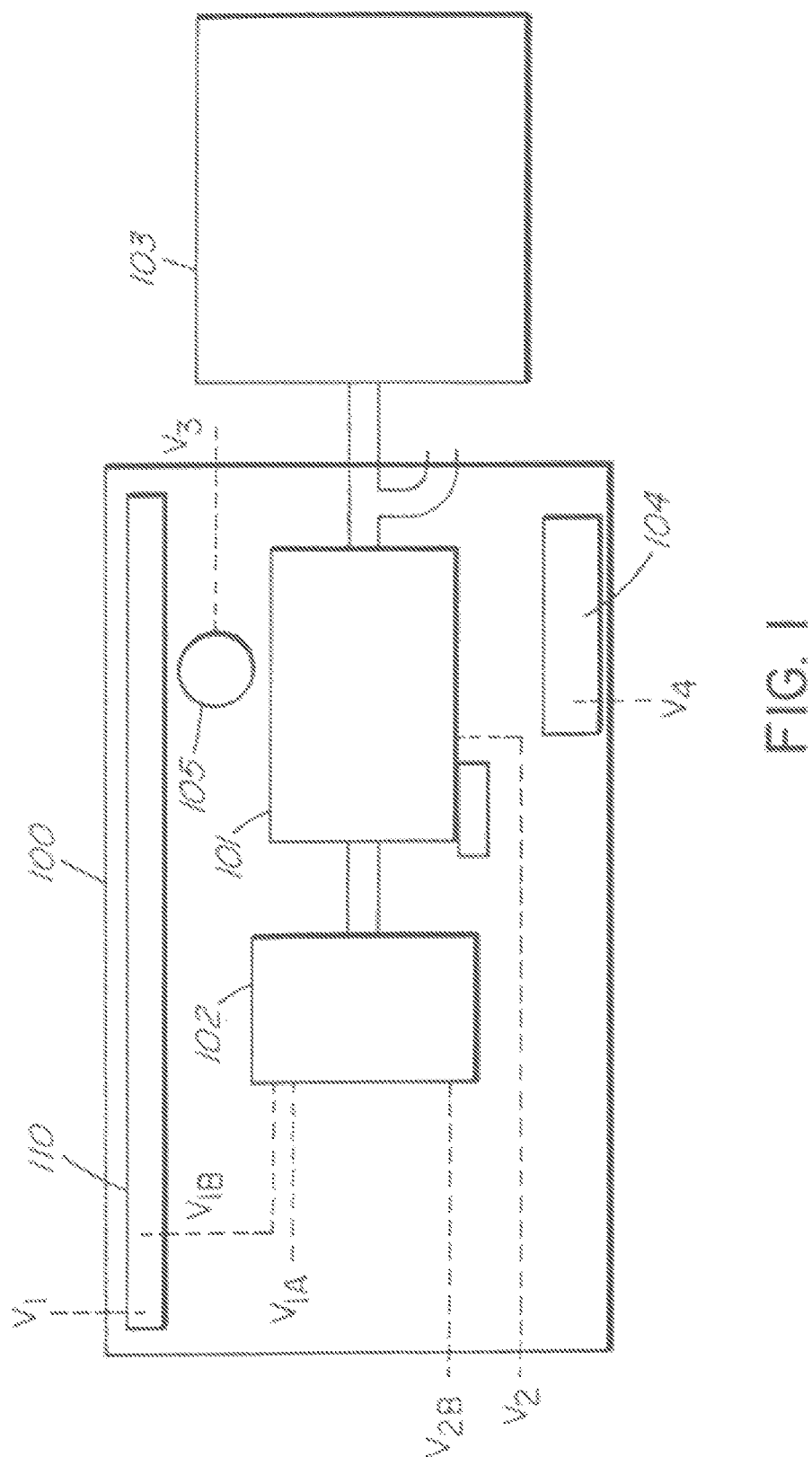
FIG. 1 is a diagrammatic illustration of a typical building housing an engine and a compressor driven by the engine and which illustrates various sources of fugitive combustible gases which may be used as a supplementary fuel source for the engine according to the invention.

Referring to the drawings, an engine is shown generally at 101 in FIG. 1. The engine 101 is conveniently a natural gas powered engine normally located at a place of natural gas production. The engine 101 powers a compressor generally illustrated at 102. The engine 101 and compressor 102 are normally located within a building 100. As is usual, an outside location for cooling apparatus 103 assists in drawing cooler air or cooling water for cooling purposes.

A cabinet 104 for housing various instrumentation used in support of the engine 101 and compressor 102 is located near the engine 101. A petroleum liquid storage tank 110 is also conveniently located within the building 100.

Emissions of fugitive combustible gases are shown as originating from four (4) sources in FIG. 1. $V_1$ represents the gases released from the petroleum liquid storage tank 110. $V_{1a}$ and $V_{1b}$ leakages originate from the compressor 102 which gases are routed into the petroleum liquid storage tank 110 and leave with leakage $V_1$. Leakages $V_{1a}$ and $V_{1b}$ represent leakages from the various packings used to seal the compressor 102 thereby to prevent the escape of gases. $V_2$ represents the fugitive emissions released from the crankcase of the engine 101. $V_3$ represents the gases released from the pneumatic control of a control valve 105 and $V_4$ represents the emissions released from the instrumentation used in support of the engine 101 and compressor 102, housed in cabinet 104.

Figure 2:
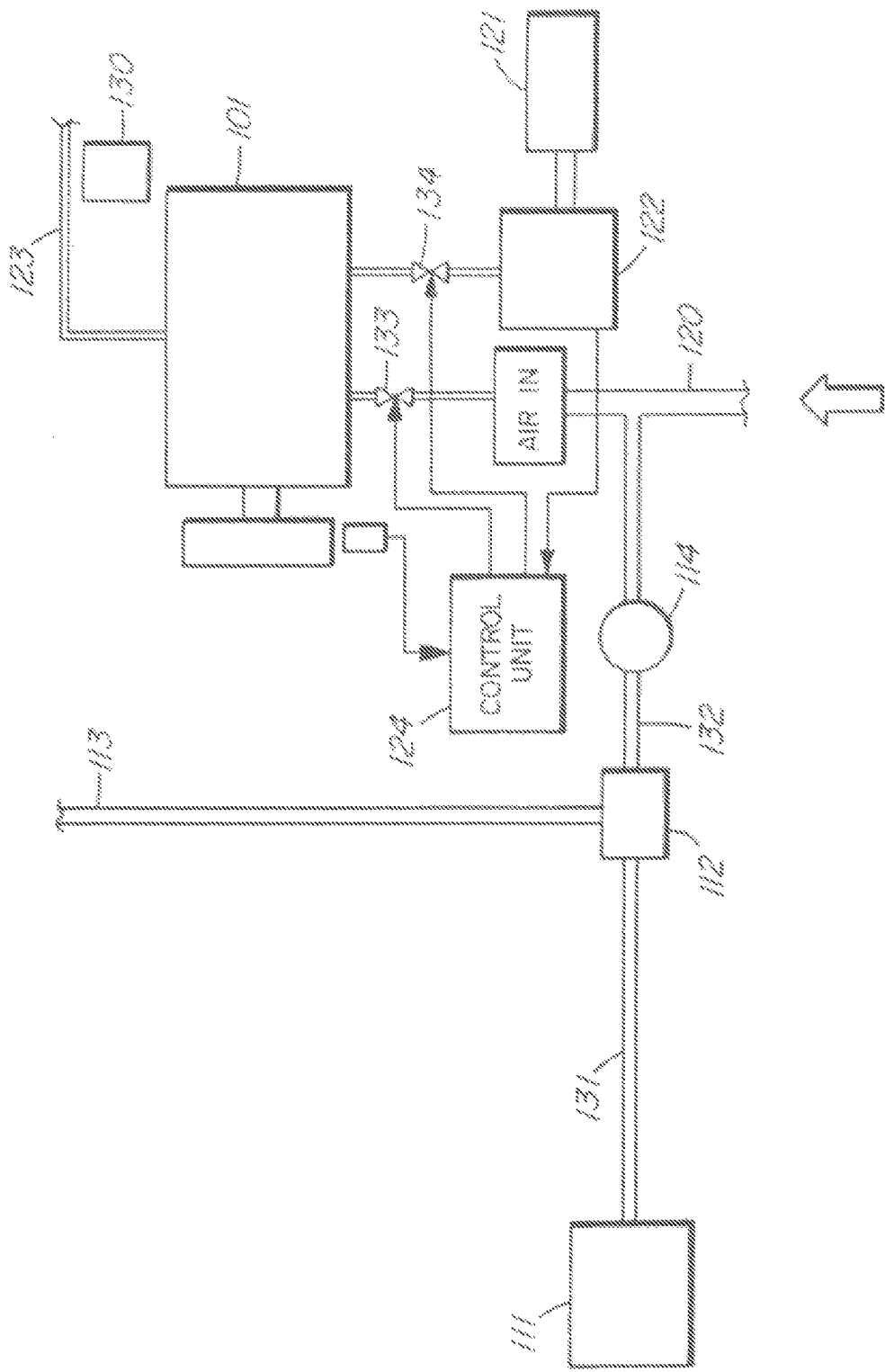
FIG. 2 is a diagrammatic illustration of a typical control circuit used to regulate the input of fugitive combustible gases to the engine according to the invention.

Referring to FIG. 2, the fugitive gases shown as being emitted from various locations within the building 100 of FIG. 1 are collected into a collector source 111 by way of appropriately sized and appropriately located ducting, piping, tubing and the like. These collected fugitive gases are fed into ducting 131 extending to a diverter valve 112 which, in a first configuration, passes the fugitive emissions to the normal vent or stack 113 to bypass the engine 101 and which, in a second configuration, pass the gases to a flow meter 114 and thence to the air intake 120 of the engine 101. The fugitive gases and the air enter the engine 101 from the air intake 120 through a control valve 133.

Fuel from the normal fuel source 121, conveniently natural gas in the case of a natural gas powered engine 101, passes to a fuel meter 122 and, thereafter, to the engine 101 through a control valve 134. Combustion products from engine 101 are exhausted through an exhaust stack 123. An exhaust analyzer 130 may monitor the combustion products from the engine 101 passing through the exhaust stack 123.

Various control techniques are contemplated as will be explained in greater detail. A control unit 124 is operatively connected to the fuel meter 122 and to the valves 133, 134 which control unit 124 controls the quantity of inletted fugitive gases and air and fuel from the normal fuel supply 121, respectively. Exhaust analyzer 130 may also be associated with the control unit 124. If, for example, the fugitive gases entering air intake 120 and engine 101 provide increased richness in the exhaust stack 123 as indicated by the exhaust sensor 130, the control unit 124 may adjust the quantity of air passing through valve 133 thereby maintaining the proper air-fuel ratio for efficient combustion within the engine 101.

OPERATION

With reference to FIGS. 1 and 2, the operation of engine 101 is initiated and will be operating with the normal fuel source 121 and the normal air supply entering the engine 101. The emissions of the fugitive gases from the various apparatuses 110, 101, 105 and 104 as represented by $V_1$, $V_2$, $V_3$ and $V_4$, respectively, will be collected with appropriate ducting and piping at fugitive emission collector source 111. The fugitive gases are then conveyed to the air intake 120 of engine 101 through ducting 131, diverter valve 112 and flow meter 114.

For safety reasons, the diverter valve 112 will normally divert the fugitive gases through stack 113 when the engine 101 is not running and the fugitive gases are still being collected. Alternatively, a holding container (not illustrated) may store the gases until the engine 101 commences operation. Or, the fugitive gases may be diverted to a flare stack (not illustrated) where they are burned.

Following the startup of engine 101, the position of diverter valve 112 is changed either manually or otherwise, so that the fugitive gases flow directly to the air intake 120 through ducting 132 and flow meter 114. Flow meter 114, located between the diverter valve 112 and the air intake 120, operates to measure the flow of the fugitive gases entering the air intake 120. The use of the fugitive gases operates to increase the fuel supply which enriches the fuel flow to the engine 101 thereby creating an increased engine speed. A governor (not illustrated) for measuring and controlling engine speed is operably connected to the engine 101 and the valve 134. As the engine speed increases, the governor will reduce the normal fuel supplied to the engine 101 by way of partially closing valve 134. This will act to reduce the normal fuel supplied to the engine 101 and return the engine speed to that desired. The reduced normal fuel supplied to the engine 101 will be replaced with that energy supplied by the fugitive gases thereby resulting in less use of normal fuel in the engine 101.

Depending upon the quantity of fugitive emissions available, the rate of flow of such emissions and the existing air-fuel control method for the combustion process, a variety of control techniques are available to adjust the normal fuel supplied to the engine 101 when the fugitive gases are being used as a supplementary fuel source.

For example and as previously described, an exhaust sensor 130 may be operably associated with the exhaust stack 123. The exhaust sensor 130 monitors the components in the exhaust of exhaust stack 123. If the exhaust sensor 130 senses hydrocarbon and/or oxygen content greater than desired, appropriate adjustment will be provided to either the air or fuel supply, the adjustment changing the percentage of hydrocarbons and/or oxygen in the exhaust stack thereby contributing to combustion of increased efficiency.

A further application utilises the techniques disclosed in U.S. Pat. No. 6,340,005 (Malm et al), the contents of which are herein incorporated by reference. The flow of the fugitive gases added to the inlet 120 of the engine 101 may be measured by a flow meter 114 as earlier set forth. As the rate of flow of the fugitive gases increases, the rate of flow of the normal pressurized fuel will decrease thereby causing the normal control system based on the quantity of normal pressurized fuel relative to the air supplied to deliver too little air. By combining the fugitive gas flow with the normal pressurized fuel flow, the control unit 124 will maintain the proper fuel-air ratio in engine 101 to provide for appropriate and efficient combustion. Thus, the normal fuel entering the engine 101 through fuel meter 122 is replaced by the supplementary fuel supply provided by the fugitive gas emissions and measured by flow meter 114. The fuel flow meter 114 can also be calibrated to ensure that the quantity of fuel added to the engine 101 by the fugitive emissions does not exceed the fuel supply required by the engine 101.

Figure 3A:
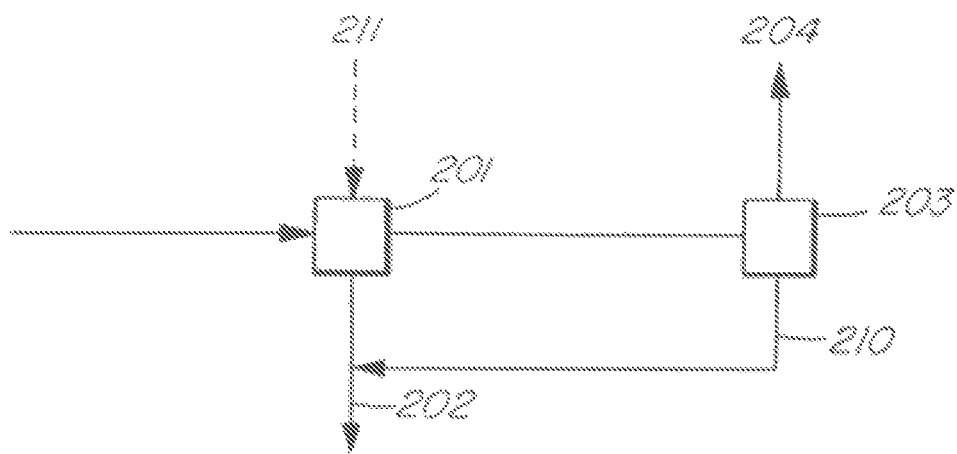
FIGS. 3A-3E diagrammatically illustrate various control techniques when fugitive gases are used as a supplementary fuel source for the engine according to the invention.

Yet a further control application is illustrated in FIG. 3A where manual control is used for the fugitive gases entering the air intake 204. A diverter valve 201 is provided which allows the fugitive gases to pass to the normal fugitive gas vent or stack 202 which may vent or burn the fugitive gases. A control signal 211 may provide that the diverter valve 201 pass all fugitive gases to the stack 202 in the event there is an engine failure or an engine shutdown. A three-way manual valve 203 is provided downstream of the diverter valve 201. This valve 203 provides for the entry of fugitive gases to the air intake 204 of the engine and it can be adjusted to regulate the quantity of fugitive gases to the air inlet 204 and to the fugitive gas stack 202 through piping 210. A slow addition of fugitive gases passed to the air intake 204 by adjusting valve 203 will minimize the engine speed change and will allow the operator to manually adjust the air-fuel ratio to account for the addition of the fugitive gases. When engine operation ceases, a control signal 211 moves the diverter valve 201 so that the fugitive gases vent to stack 202 in the normal manner. The three-way valve 203 should be selected so that the flow path of the fugitive gases is not blocked in any valve position which would stop the flow of fugitive gases and contribute to pressure buildup in the collection system 111 (FIG. 2). This technique is relatively simple and inexpensive and, under certain gas flow conditions, it is contemplated that the diverter valve 201 and the three-way valve 203 could be combined into a single valve.

A further embodiment of the control technology is contemplated wherein an exhaust gas sensor is provided which initiates a signal related to the amount of oxygen and/or unburned fuel in the combustion exhaust. Normally, this technique would use the signal to control the air/fuel ratio for the combustion. If the signal advised that the mixture was too rich, the normal air supplied to the engine would be increased and if the signal advised that the air/fuel ratio was too lean, the normal air supplied to the engine could be decreased. Similarly, the proportion of fugitive gases could be increased or decreased relative to the normal fuel entry. This control technique is generally referred to a closed loop air/fuel control.

Figure 3B:
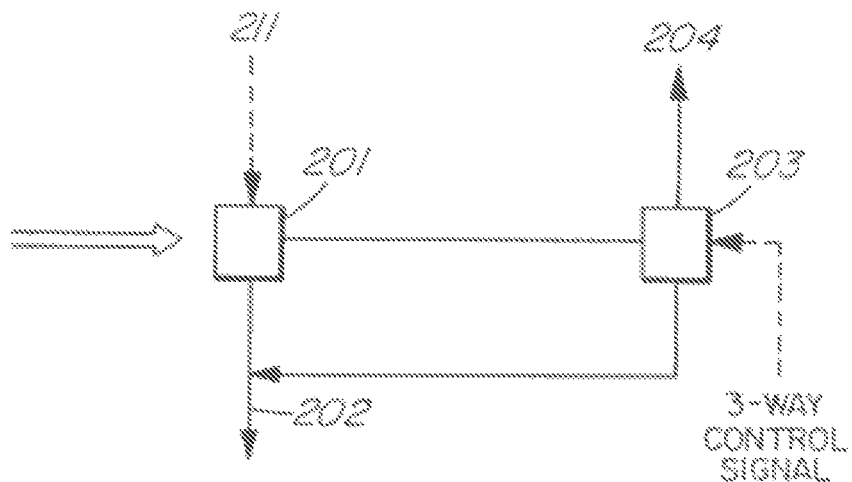

A further control technique is illustrated in FIG. 3B wherein automatic control of the three way valve 203 is provided which allows the control system to control the quantity of fugitive emissions diverted to the combustion air intake 204. If the addition of fugitive gases to the air intake 204 through valve 203 is excessive thereby prohibiting the engine speed from otherwise being automatically adjusted, a control signal advises the three-way valve 203 that any excessive quantity of fugitive gases are to be diverted to the fugitive gas stack 202. In this embodiment, it is contemplated that the diverter valve 201 could be deleted with control of the fugitive gases provided wholly by the three-way valve 203.

Figure 3C:
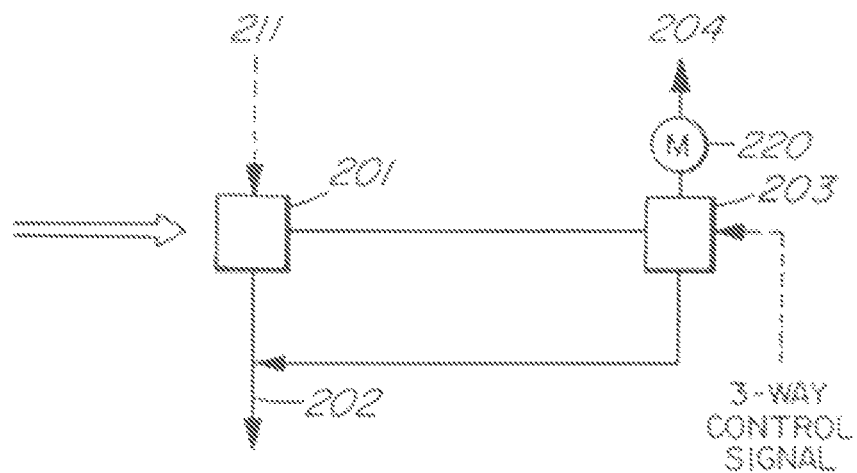

In yet a further control technique illustrated in FIG. 3C, a flow meter 220 is added upstream of the engine air intake 204 and downstream of three-way valve 203 to measure the quantity of fugitive gases added to the air intake 204. The information obtained from the flow meter 220 can be used to determine general operating characteristics and/or to determine the fraction of fuel used by the engine which originates with the fugitive gases. In this embodiment, the diverter valve 201 could be deleted with control provided solely by the flow meter 220 which would provide appropriate control signals to three-way valve 203.

Figure 3D:
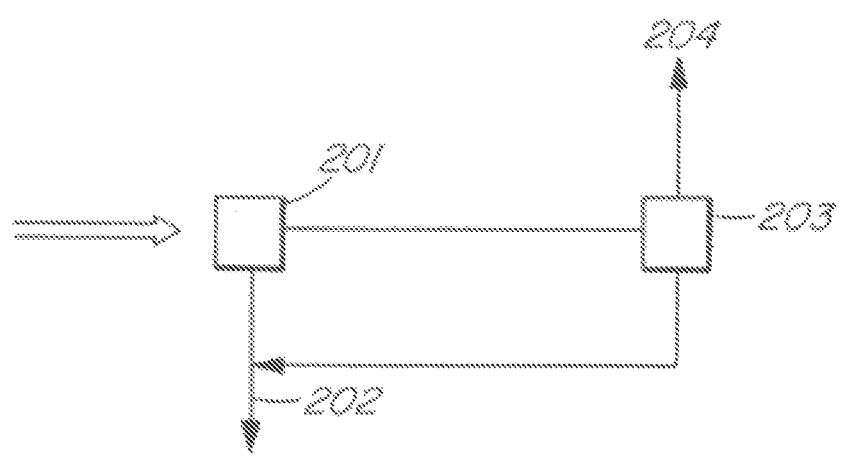

A further control technique using a combination of fuel flow measurement and manual control for the fugitive gases is illustrated in FIG. 3D. In this embodiment, as the fuel flow comprising normal fuel and fugitive gases increases, the control system will increase the air flow to the air intake 204. If the flow of fugitive gases is relatively constant, following the initiation of the fugitive gas flow, the control system can be adjusted to compensate for the addition of the fugitive gases. Diverter valve 201 ensures that the fugitive gases are vented in the event of engine shutdown or a safety hazard arising. Any changes in the rate of flow of the fugitive gases will be done manually since no automatic adjustment of the fugitive gas flow rate is provided in this case.

Figures 3E, 4:
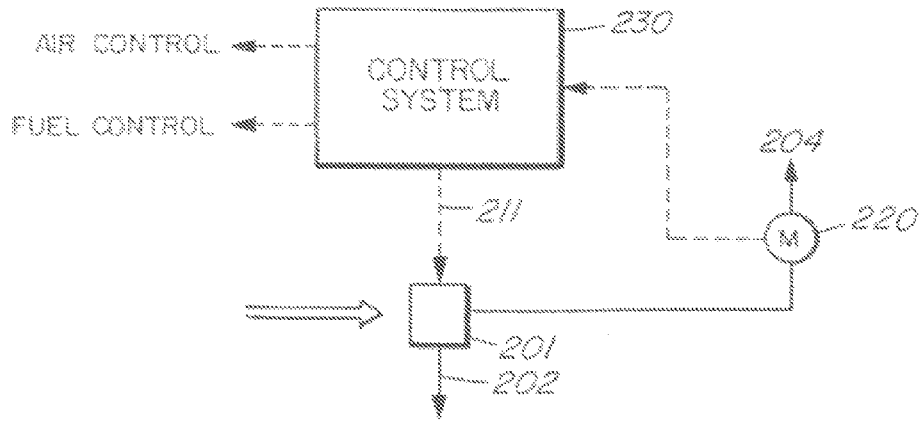
FIG. 4 is a table illustrating fugitive gas emissions taken from various sources in a typical operating environment during experimentation.

A further control technique is illustrated in FIG. 3E. The control system 230 utilises fuel flow measurement and fugitive flow measurement with the air-fuel ratio being controlled by the rate of air flow to the combustion process. To maintain the desired air-fuel ratio, a fugitive gas flow meter 220 is required. The fugitive gas flow measured by meter 220 is added to the normal combustion fuel flow value and the control system 230 will use the input from flow meter 220 to determine the proper quantity of air to be added to the air intake 204. In the event, for example, that the fugitive gas flow is small, the control system 230 is contemplated to be sufficient to determine the correct air quantity without the use of flow meter 220. For higher flows of fugitive gases, however, the fugitive gas flow signal from flow meter 220 can be used as a feed-forward signal to adjust the combustion fuel control valve (not illustrated) coincident with the addition or removal of the fugitive gases. This fugitive gas flow value is again useful for operating information and/or to determine the fraction of fuel used by the engine which may come from the fugitive gases.

In the interest of full disclosure, experiments which have been performed by the applicant are set forth below. In addition, the potential savings thought to be achievable by using fugitive emissions as a supplement fuel source are calculated. It is emphasized that these experiments and calculated possible savings have not been measured in a technically rigorous manner, nor have they been corroborated. Rather, the experiments conducted and the subsequent discussions based on those experiments are included here as being corroborative of the advantages thought to be achievable only. Applicant would not want to be bound by the experimental results given hereafter if subsequent measurements or calculations are found to be more precise or if subsequent experiments and calculations adversely affect the results described and the discussions based on those results.

EXAMPLE 1

For a typical 1000 HP natural gas engine, the amount of methane used would be approximately 1000×7500/900=8300 scf/h=139 scf/m where scf/m=standard cubic feet per minute. The average packing leak as found in reciprocating compressors is described in "Cost Effective Leak Mitigation at Natural Gas Transmission Compressor Stations", Howard et al, *Pipeline Research Council International, Inc.*, (PRCI) Catalogue No. L51802e, the contents of which are herein incorporated by reference. The measurements reveal that the leaks amount to approximately 1.65 scf/m per rod packing. For a four (4) throw compressor, this would amount to 6.60 scf/m or 5% of the fuel required for the above-identified engine. If natural gas is used for the pneumatic instrumentation, gas venting can increase to 10 scf/m or more. In addition to packing leaks, other sources of fugitive hydrocarbon gas emissions include the engine crankcase, the compressor crankcase, glycol dehydrators, petroleum liquid storage tanks, engine starting systems and unit blow downs during gas venting operations.

EXAMPLE 2

Other sources of fugitive gases in a typical operating environment such as the engine compressor unit located within the compressor building 100 illustrated in FIG. 1 were measured. The results of those measurements are given and set forth in FIG. 4. The vent flow measurements were taken by a rotometer which was calibrated for air and then multiplied by a correction factor for natural gas. It will be seen from FIG. 4 that the total estimated fugitive emissions by the sources measured amount to approximately 9 scf/m which is the value used in the calculations given hereafter. It will further be noted the term 546 I/P stands for a Fisher 546 model current/pressure transducer. A current to pressure transducer (I/P) takes a 4 to 20 ma control signal from the controller and coverts it to a proportional gas pressure. This gas pressure then controls a diaphragm on a control valve.

The fuel flow consumption was approximately 138 kg/h at 932 rpm. The estimated load percentage based on fuel was 72% by using the manufacturer's specifications for the maximum load capacity and comparing it with the actual load for the engine estimated from the operating conditions. Using a fuel density of 0.79 kg/m3, the fuel flow is (138 kg/h/0.790 kg/m3)×(35.3 ft3/m3)/60 min/h=103 scf/m. Thus, the fugitive emissions released at this location amounted to approximately 8.7% (9 scf/m/103 scf/m=8.7%) of the total engine fuel consumption.

EXAMPLE 3

A test was undertaken to add fugitive gases to the engine inlet of a Waukesha 7042 GSI engine modified for lean operation which powered a four (4) throw, two (2) stage Ariel JGK-4 compressor. Only the vent gas $V_4$ from the instrument cabinet 104 (FIG. 1) was used. This was so because the cabinet 104 used for housing the instruments provided a convenient source for fugitive gases from the instrumentation and a convenient place to connect a rubber hose for conveying the gases first to a three-way valve and then to the engine air intake. The three way valve was positioned in the hose between the cabinet and engine air intake thereby allowing the gas to be vented or directed to the air intake and which also allowed a sample of the gas to be taken. A subsequent gas analysis confirmed that the fugitive or vent gas measured was principally a combustible hydrocarbon mixture. The speed of the Waukesha engine was set to 932 rpm and the measured suction pressure at the compressor intake remained relatively constant during the test, ranging between 347 to 358 kPa, which confirmed the relatively constant engine load during the test.

When the fugitive gases from the instrument cabinet 104 were initially directed to the air intake of the engine, the engine speed initially increased and then recovered to the set point of 932 rpm. The fuel flow recorded by the engine flow meter dropped from 126.6 kg/h to 115.2 kg/h which indicated a potential fuel saving of about 10 kg/h. The exhaust oxygen dropped from 7.6% to 6.6%. The air control valve was then adjusted to bring the exhaust oxygen percentage back to the approximate starting value. The decrease in fuel flow for the engine operating with the same exhaust oxygen percentage was (126.6–118.6)=8 kg/h which was a decrease of approximately 6.3%. To check this value, the gas flow through the vent was measured at a value of 5.6 scf/m (air) or 6.6 scf/m (gas). Converting this flow to metric mass flow gave a value of 8.8 kg/h. This correlated with the decrease in fuel flow observed with fuel enrichment by way of the fugitive gas supply to the air inlet.

EXAMPLE 4

Based on the measurements given above, the savings in fuel would be in the range of CDN$20000.00 to CDN$30000.00 per year for this engine. Since the fugitive gas emissions are normally vented and lost, and assuming the gas price of $5.00/GJ (Giga Joule)=5.27/MMBTU (million British Thermal Units)=$4.79/Mscf (thousand standard cubic feet) (GHV (Gross Heating Value)=1100 BTU/scf), the lost value of the vented gas is CDN$3100/year for gas vented at 1 scf/m. Thus, the value of the vented gas from the compressor building alone was calculated to be approximately CDN$25,000.00 per year.

EXAMPLE 5

In this case, the fugitive emissions were mostly methane. These emissions contribute to greenhouse gas (GHG) emissions. A calculation reveals that the fugitive emissions and the engine $CO_2$ result in the equivalent or estimated GHG emission ($CO_2(e)$) of 4900 Tonnes per year (=$CO_2$ mass/y+21× $CH_4$ mass/year). If the fugitive emissions are used as fuel by the engine, the $CO_2(e)$ would drop to 3010 Tonnes per year, a decrease of 40% or 1890 T/y. Thus, this is contemplated to provide a good technique for the reduction of greenhouse gases.

Many modifications may readily be contemplated to the invention. Although the teachings are specifically directed to a natural gas engine where natural gas is used as the normal fuel, the fugitive gases are contemplated to be a useful supplementary fuel source for other engines, including diesel and gasoline powered engines and turbines. Indeed, with appropriate controls, it is contemplated that the fugitive gases may be usefully added as a supplementary fuel to virtually any device using the combustion of air and fuel where the fuel may be liquid or gaseous so long as the fuel is combustible.

In addition, although the invention has been described as providing for the fugitive gases to emanate from a storage tank to an engine and compressor located within a building, the presence of a building is of course unnecessary and quite optional. The engine and/or compressor and/or storage tank may be instead located in the open.

Figure 5:
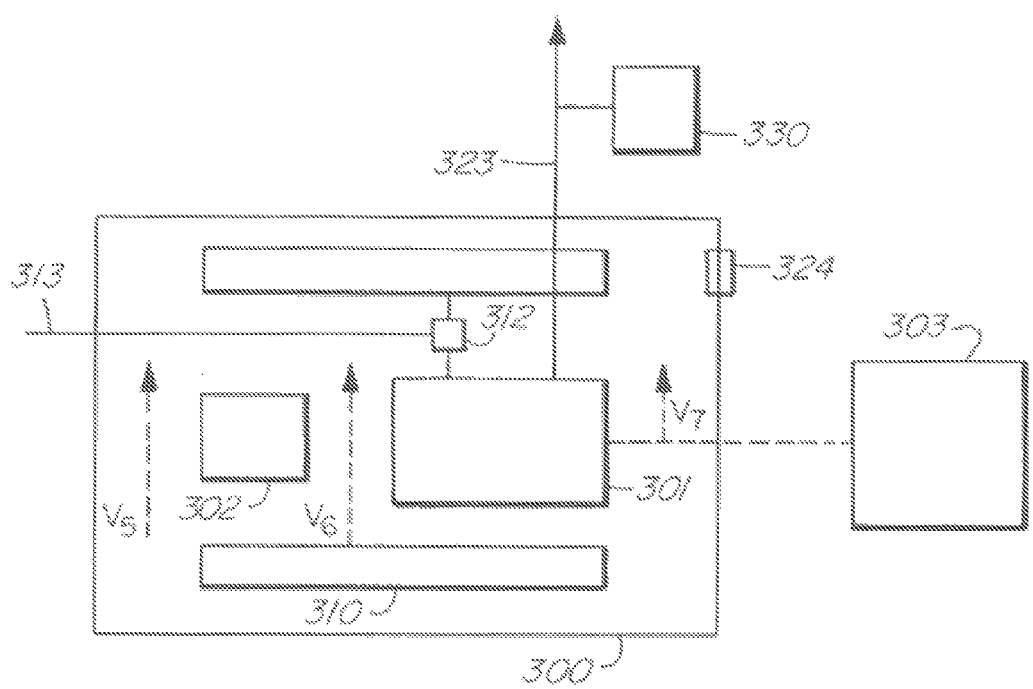
FIG. 5 is a side diagrammatic view which illustrates a building which encloses various sources of fugitive gas emissions which pass into the atmosphere of the building and are diluted thereby and which are collected near the ceiling or upper portion of the enclosed building according to a further aspect of the invention.

Yet a further embodiment of the invention is contemplated where the fugitive gases may have been diluted by air as is illustrated in FIG. 5. Such fugitive gases may have escaped from various sources such as block and control valves, pressure relief valves, regulators, flange connections, compressor seals, compressor valve stems and valve caps, coal mines, livestock and sewage treatment and the like without such list being all inclusive. Sources for such fugitive gases are described in "Catalytic Solutions for Fugitive Methane Emissions in the Oil and Gas Sector", Hayes, R. E., *Chemical Engineering Science* 59 (2004) 4073-4080. While Hayes describes the source of such dilute fugitive gases, he does not contemplate that the dilute fugitive gases could be used as a supplemental fuel source for an engine or turbine.

The fugitive gas emissions which are diluted by air may occur in buildings where the sources of gas emissions are located. Typically, the air in such buildings is replaced constantly with the use of vans or ventilators using atmospheric air which is provided to the building and which replaces the internal air of the building together with the escaped fugitive gases. A fugitive gas of considerable interest is methane which, being of a density which is lighter than air, passes to the inside ceiling of the building before being replaced by external air and evacuated to the atmosphere.

It is contemplated that such methane and other dilute fugitive gases being of a density lighter than air can be collected and used as intake air for the engine or turbine in which the fuel is used and thereby serve as a supplementary fuel for the engine or turbine similar to the procedure desired above where an exhaust gas oxygen sensor is described. The use of methane as a supplemental fuel source is particularly attractive since methane is a greenhouse gas. The combustion of such methane is beneficial to reduce greenhouse gas emissions.

Reference is made to FIG. 5 where the fugitive gases are shown as being emitted from various locations within the building 300 which gases particularly will usually include methane and which gases are shown by the broken lines $V_5$, $V_6$ and $V_7$. The fugitive gases migrate to the inside ceiling of the building 300 because they will include, typically, methane which is of a density lighter than air. They are collected there by a collector 311. These collected dilute fugitive gases are fed into ducting 311 extending to a diverter valve 312 which, in a first configuration, is positioned such that all of the engine intake air is drawn via a duct 313 from outside the building. The exhaust fan 324 is turned on to ensure the dilute fugitive gases are drawn from the building. In a second configuration, the diverter valve is moved to draw all or part of the engine intake gases from the collector 311. The control and inletting of natural gas or other fuel together with control processes provided for the collected and dilute fugitive gases is similar to the embodiments earlier described to obtain the desired air-fuel control for the engine or turbine which utilises the dilute fugitive gases as a supplemental fuel source. The diverter valve 312 is controlled (manually or by a control system) to achieve the desired amount of outside intake air and intake air, which may contain diluted fugitive gases. An exhaust sensor 330 may conveniently be associated with the exhaust stack 323 to monitor the components in the exhaust of exhaust stack 323 as previous described.

It is further contemplated that the animal husbandry may be a source of methane and that the building 300 may be a barn, for example, with cattle or other animals being located therein. The methane produced by the animals would be collected in a similar manner to that described and inputted to an engine or turbine 303.

Figure 6:
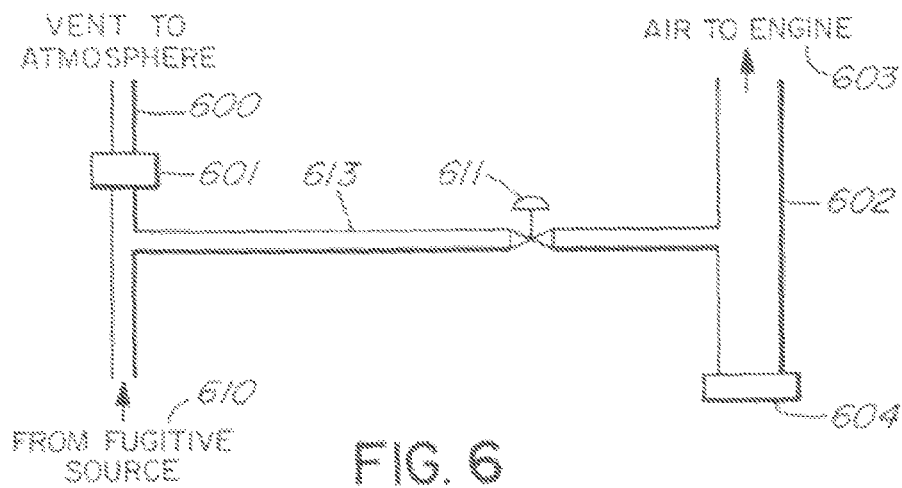
FIG. 6 is a diagrammatic schematic view particularly illustrating a check valve positioned in an exhaust stack according to the invention.

Yet a further embodiment of the invention is illustrated in FIG. 6. With the engine in operation, there is a negative pressure at the intake to the engine which tends to draw in the collected fugitive gases which are subsequently used as a fuel source. The negative pressure tends not only to draw in the fugitive gases but it also tends to draw in air through the exhaust stack which otherwise would vent the fugitive gases to the atmosphere when the engine is not in operation. In accordance therewith, FIG. 6 illustrates an exhaust stack 600 and a passive check valve 601 which is installed in the exhaust stack 600. The check valve 601 prevents the ingress of air into the intake ducting 602 which extends to the engine 603 and which otherwise allows atmospheric air passing through air filter 604 to the intake ducting 602.

The passive check valve 601 is operable to maintain a maximum positive pressure at the source 610 of fugitive gases of 1 to 5 inches of water ($H_2O$) where the pressures are here stated as inches of water column with 27.7 inches of water column equaling 1 psi or 6,895 kiloPascals.

A control or on/off valve 611 is closed when it is not desired to use the fugitive gases as a fuel source such as when the engine 603 is not in operation. The fugitive gases will thereby pass directly to the stack 600 and vent to the atmosphere and the back pressure exerted by the check valve 601 is of a value that it will not adversely affect this passage of the fugitive gases to the atmosphere through stack 600.

When the control valve 611 is open and the engine 603 is in operation, the fugitive gases will pass directly to the engine air intake 602. The slight negative pressure created by engine operation will provide additional force on check valve 601 to maintain it in its closed position thereby preventing backflow of air through the stack 600 and into the air intake 602. With the flow of atmospheric air transmitted through the control valve 611, fugitive gas flow into the engine 602 can be measured and better controlled.

Figure 7:
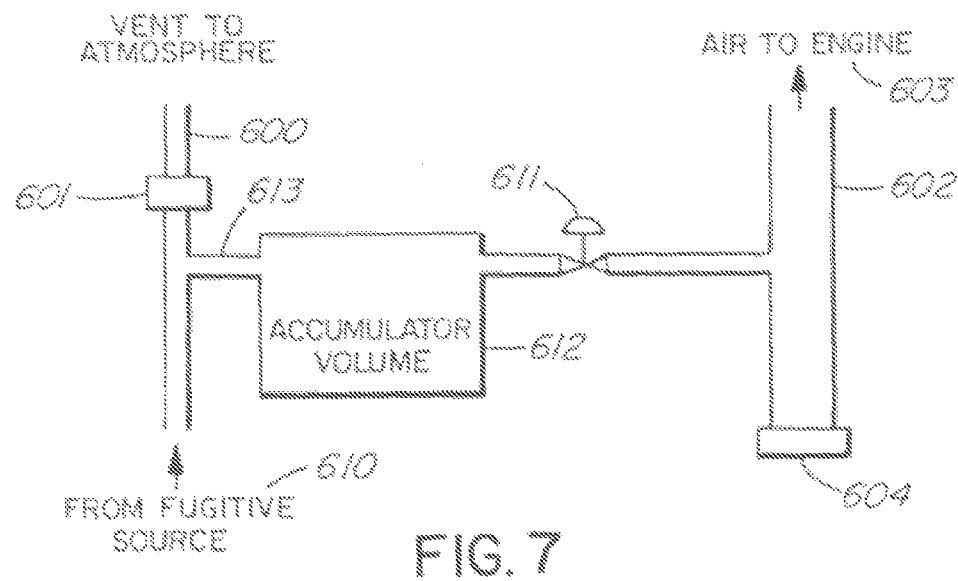
FIG. 7 is a diagrammatic schematic view of an accumulator positioned between the exhaust stack of an engine and the intake of the engine according to the invention.

Yet a further embodiment of the invention relates to the addition of an accumulator 612 within the duct 613 extending from the fugitive gas source to the engine 603 as illustrated in FIG. 7. The use of an accumulator 612 is valuable if the flow of fugitive gas is variable on a short term basis. The accumulator 612 will smooth out the fluctuations in fugitive gas flow to the engine 603 thereby obviating excessive instrument and control variations. The volume of the accumulator 612 selected is calculated based upon the volume of gas flow from the fugitive gas source 610 and the expected time variables involved in such flow.

In operation and when the control valve 611 is open and the engine 602 is in operation, the normal pressure in the accumulator 612 will be similar to the pressure in the air intake, typically 3 to 15" H2O below atmospheric pressure. If there is a burst of fugitive gases, the pressure in the accumulator 612 will rise to a maximum determined by the check valve 601. When the check valve 601 opens, the excess gas is vented through stack 600 to the atmosphere. If the fugitive gas burst is small relative to the volume of the accumulator 612, the fugitive gases will all be consumed by the engine 603 due to the storage capacity of the accumulator 612.

Figure 8:
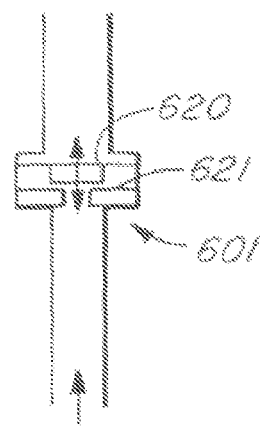
FIG. 8 is an enlarged view of the check valve of FIG. 6 but illustrating the typical operation of such check valve.

The check valve 601 is conveniently better illustrated in more detail in FIG. 8 wherein one embodiment is shown. A seal 621 is conveniently provided to prevent the ingress of air and for reliability purposes, no spring is used and the weight of the movable member 620 is designed to provide a force equivalent to a pressure of 1 to 2" $H_2O$ closure force on the check valve 601. A pliable material is conveniently provided to ensure seal integrity for the small forces involved.

The present application relates to the addition of combustible fugitive gases to an engine in order to reduce greenhouse gases and in order to reduce the cost of fuel for the engine to which they are added. A variety of sources may have fugitive gas emissions which are added to the air intake of an engine. The emissions may or may not be mixed with air prior to their introduction to the air intake.

In a further embodiment of the invention, additional techniques are contemplated in ensuring fugitive gases are properly introduced to engines, principally by way of the air intake.

In a normal engine, the air comes from the atmosphere and the fuel, either in liquid or gaseous form, is added to the air, either before the duct to the cylinder (e.g. with a carburetor), in the duct to the cylinder (e.g. duct injection), or directly into the cylinder (e.g. direct injection). Normally the speed of an engine is controlled by the amount of fuel or fuel-air mixture that reaches the intake manifold. Various control devices and/or systems ensure the ratio of fuel to air is maintained to ensure the desired combustion conditions.

When combustible vapors are added to the otherwise pure air, additional controls must be provided to ensure the engine speed is still controlled and that the ratio of fuel to air is maintained. While some sources of these fugitive vapors provide steady supply, in general, the amount and quality of the fugitive gases are unsteady. This occurs because the fugitive vapors may originate from unrelated or partly related sources and as a consequence change in composition and amount. The additional control devices and systems must be able to adjust for these changes. Since the use of fugitive combustible vapors displaces fuel, it is economically advantageous to use as much of the fugitive vapors as possible. In some cases, since many fugitive vapors have a more negative environmental effect than the products of combustion (for example methane gas), there is an environmental benefit to use as much of the fugitive vapors as possible.

Figure 9A:
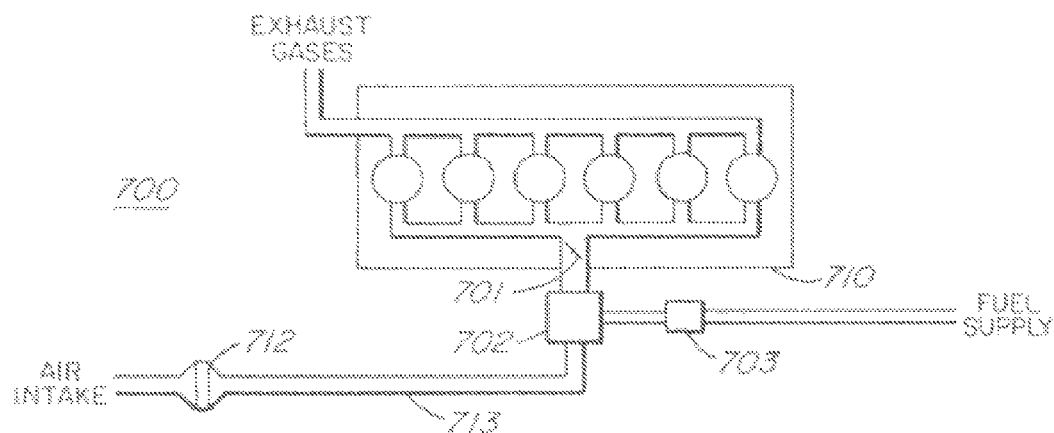
FIGS. 9A and 9B diagrammatically illustrate spark ignited engines with a naturally aspirated engine shown in FIG. 9A and a turbo charged engine being shown in FIG. 9B.
Figure 9B:
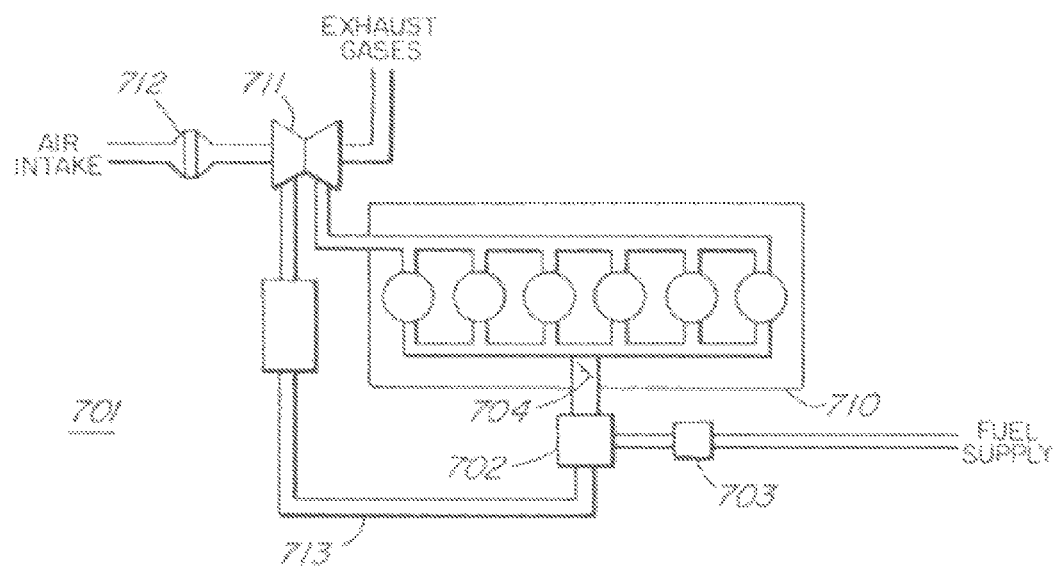

Reference is initially made to FIGS. 9A and 9B which each illustrate a spark ignited engine generally illustrated at 700, 701, respectively, the initial engine 700 of FIG. 9A being a naturally aspirated engine and which engine 701 illustrated in FIG. 9B is a turbo charged engine where air is pressurized prior to entry into the engine 701. In addition to turbochargers, blowers, compressors and superchargers could conveniently also be used to increase the air pressure supplied to the engine.

In the normal configuration the engine 700, 701 has a specific method for controlling the amount of fuel admitted to the engine. This control may be by a carburetor 702 and a fuel control 703 such as a fuel regulator, a fuel valve, fuel pump or other such device. The amount of fuel delivered to the engine controls the engine speed, which is set manually or by a governor. In FIGS. 9A and 9B, air intake speed control is by a throttle valve 704 which controls the rate at which the air fuel mixture goes to the manifold 710, while the carburetor 702 adds an amount of fuel approximately proportional to the amount of air passing through it. The air comes directly from the atmosphere or from a turbocharger 711 or similar device which increases the pressure of the air delivered to the engine 701 to greater than one atmosphere.

An air filter 712 is conveniently placed in the intake air duct to prevent undesired materials from getting into the engine 700, 701. The air passing through the filter 712 experiences a relatively small drop in pressure, depending on the characteristics of the air filter 712.

The addition of fugitive gases, such as from a fuel tank or engine crank-case, call for the addition of these gases after the throttle valve 704 where there is a significant vacuum due to the presence of a partly open throttle valve 704. The negative pressure acts to draw the fugitive vapors to flow to the engine 700, 701. This method, however, cannot work with an engine where the air pressure is increased with a turbocharger 711 or other pressure increasing device. In such a case, the fugitive gases must be added before the pressure increasing device.

If combustible gases are added to the intake air, less normal fuel is required and the governor or manual operator will adjust the supply of normal fuel to achieve the desired engine speed. If the supply or heating value of the added gases changes rapidly, then the normal control system will be unable to maintain the desired engine speed. Additional control is therefore required.

If combustible gases are added to the intake air, there must be some method to turn-off the flow of these gases to the intake air if the flow of gases is too large for the normal speed control devices, or if the engine is stopped. To enable reliable engine starting, the intake air duct should be free of significant combustible gases before starting. This requires a special starting arrangement.

A further factor to consider is that the air to fuel ratio is usually regulated to control emissions such as carbon monoxide (CO) and nitrogen oxides (NOx). With the addition of the fugitive gases to the engine intake air, adjustment to the air-fuel control may be required.

Several embodiments are therefore contemplated to add fugitive gases to engines in accordance with such problems. The embodiments are conveniently divided into fugitive gas capture techniques, fugitive gas control techniques, air-fuel control modifications and measurement methods.

Figure 10:
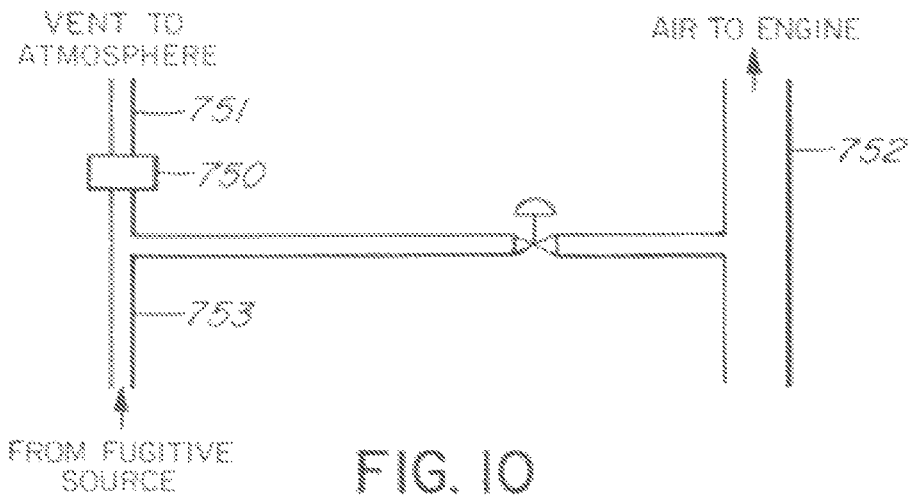
FIG. 10 is a diagrammatic view of a check valve positioned in a fugitive gas vent which is used to provide a positive pressure head for the fugitive gases.

A first technique for capturing fugitive gases involves the installation of a low pressure check valve 750 placed on the vent pipe 751 where such fugitive gases are normally vented to the atmosphere as is illustrated in FIG. 10. The check valve 750 provides a positive pressure head to cause the fugitive gas to flow to the engine air intake inlet or duct 752. A low pressure is normally preferred for the check valve 750 in order to minimize the pressure build-up in the gas collection duct or piping 753. If there is a sudden burst of fugitive gases or the control system does not allow the gases to flow to the engine (not illustrated), the fugitive gases can escape through the check valve 750 and vent to atmosphere.

Figure 11:
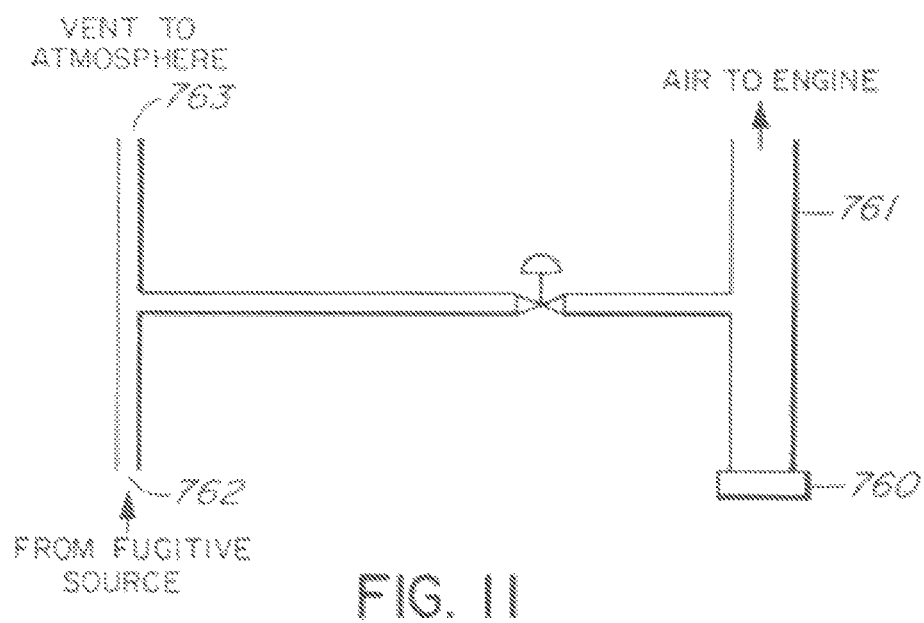
FIG. 11 is a diagrammatic view of an air filter installed in the engine intake which creates a negative pressure to allow the flow of fugitive gases into the engine intake.

The fugitive gases may also be added after the air filter 760 of an engine (not illustrated) as seen in FIG. 11 since it is common to use such air filters to remove dirt and other foreign debris from the engine air. The air filter 760 is positioned on the engine intake 761 to remove dirt and other foreign matter from the engine air. This filter 760 causes the air pressure to be negative relative to atmospheric pressure between the air filter 760 and the engine throttle valve or air pressure increasing device such as a turbocharger downstream. The negative air pressure can be used as a pressure head to collect the fugitive gases either from a pressurized system, as produced by a check valve of FIG. 10, or from the gases at atmospheric pressure.

According to the flow rate from the fugitive source to the engine intake 762, the gases may or may not contain fugitive gases. This system advantageously provides that no additional positive pressure is placed on the fugitive gas collection system and that bursts of fugitive gas flow more than is drawn to the engine air intake can freely vent to the atmosphere through vent 763.

Figure 12:
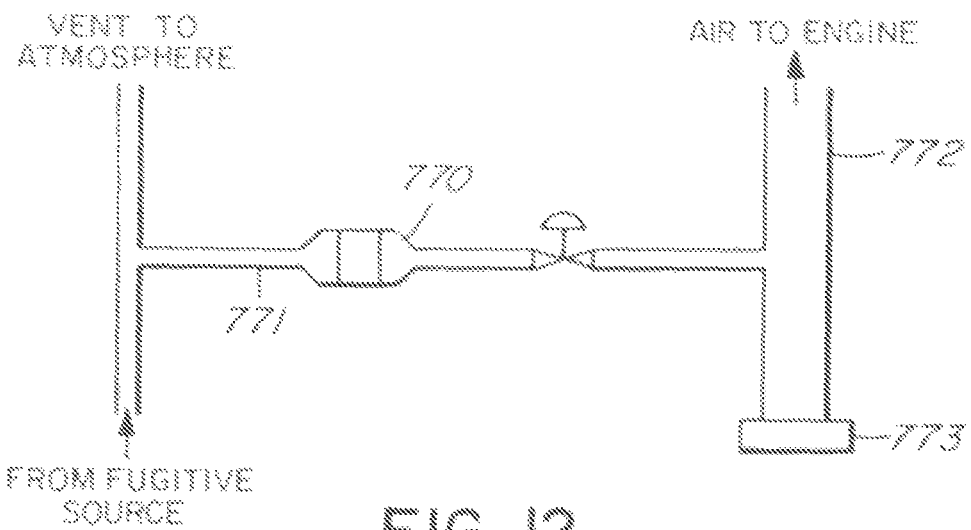
FIG. 12 is a diagrammatic view of a duct fan installed in a fugitive gas supply pipe which likewise creates a negative pressure and allows the fugitive gases to be added to the engine air before or after an air intake filter.

A further embodiment of fugitive gas capture is illustrated in FIG. 12 wherein a duct fan 770 is conveniently placed in the pipe 771 conducting the fugitive gases to the engine intake air 772. Such a duct fan 770 is chosen with regard to the capacity also ensures that a positive pressure is not required in the fugitive vent system, and the vent gases may be added to the engine air before or after the air intake filter 773.

Figure 13:
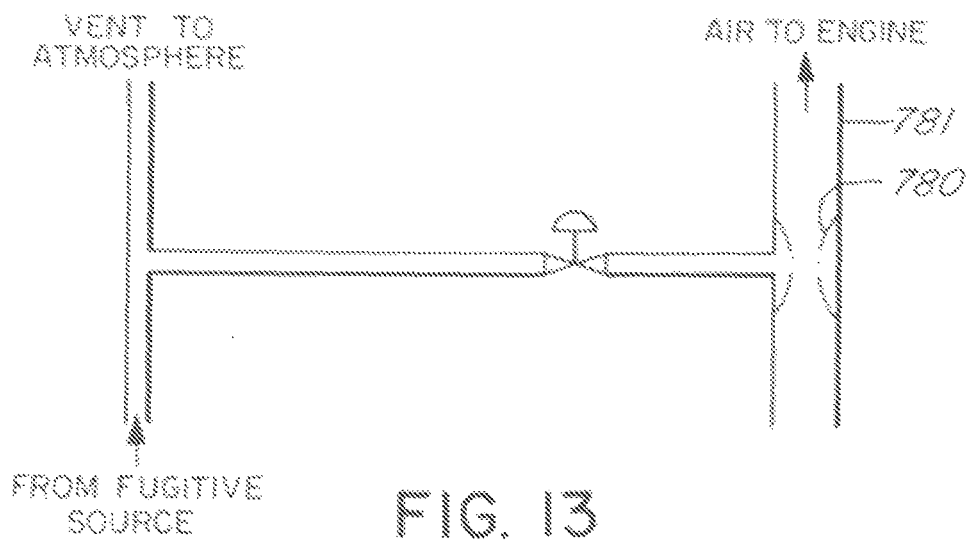
FIG. 13 is a diagrammatic view of a venturi positioned within the engine intake which creates a negative pressure to draw fugitive gases into the engine intake and subsequently the engine.

A further technique for fugitive gas capture is illustrated in FIG. 13 in which a venturi passage 780 is placed in the intake air duct 781 of the engine (not illustrated) so as to create a negative pressure to draw the fugitive gases to the intake air duct 781. Such a venturi 780 results in relatively small pressure loss in the air supplied to the engine and allows the fugitive gases to be added before or after the engine air filter.

Figure 14A:
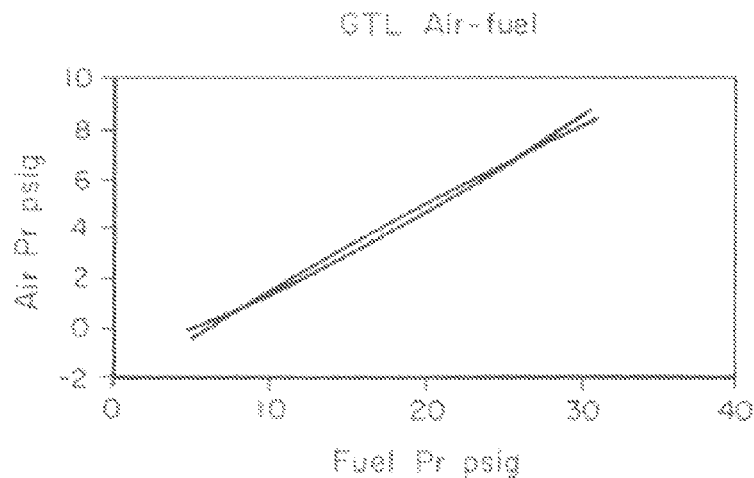
FIG. 14A is a typical air pressure-fuel pressure graph used for engine fuel and is of importance when an eductor is used to reduce the pressure of the fuel gas.
Figure 14B:
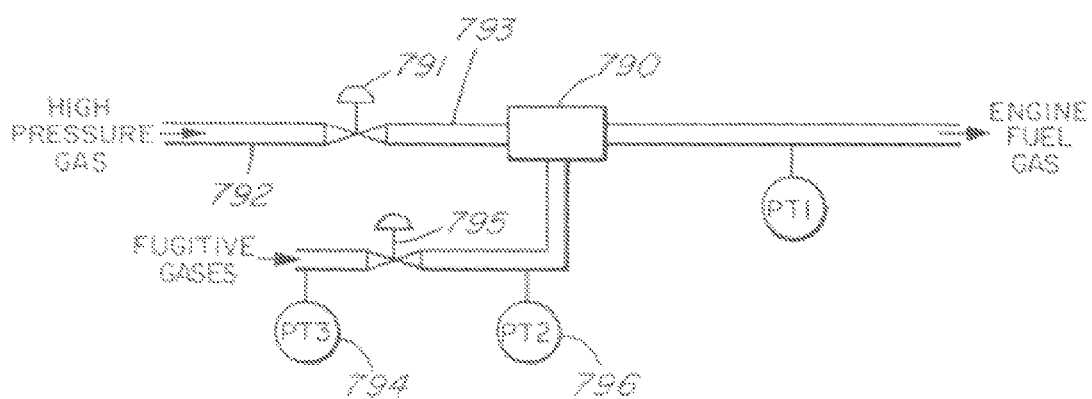
FIG. 14B is a diagrammatic view of the fuel and fugitive gas supply system when an eductor is used to collect the fugitive gases and/or reduce the pressure of the fuel gas.

In a further technique used for fugitive gas capture, an eductor 790 is illustrated in association with FIG. 14B. On engines utilising fuel injection, there is air scavenging of the engine cylinders. Scavenging occurs when both the intake and exhaust ports or both the intake and exhaust valves are open at the same time and for a sufficiently long period to allow the engine air to pass from the intake to the exhaust manifold without combustion. In such a case, the addition of combustible gases to the intake air would result in these combustible gases reaching the exhaust manifold. Since these exhaust gases are hot, the presence of these added combustible gases may create an unsafe condition. For such scavenging engines, the fugitive gases are conveniently added to the main engine fuel, which is at a positive pressure as seen in FIG. 14B. A typical air pressure-fuel pressure curve is given at FIG. 14A. The engine fuel is often derived from a relatively high pressure source>100 psig. If the source is a compressor discharge line, the pressure may exceed 500 psig. One or more regulators are used to reduce the pressure to a constant value. A fuel control valve 791 ensures the pressure of fuel for injection to the engine is of a value to maintain the desired engine speed. The eductor 790 is used in this embodiment both as a pressure reducing device and as a means to collect the fugitive gasses into the fuel stream.

A governor or governor control (not illustrated) is operable to open or close the fuel control valve 791. If the engine speed drops below its set point, the fuel control valve 791 is opened. If the engine speed is increased, the fuel control valve 791 is closed. As shown by the chart of FIG. 14A, the fuel pressure supplied to the engine measured by the pressure sensor PT1 (FIG. 14B) is between 5 and 30 psig. The flow of fuel gas from the high pressure source at 792 to the lower pressure fuel line 793 through the eductor 790 normally produces a lower pressure for the vent gases. The flow rate will be dependent on engine fuel consumption.

The use of an eductor to collect fugitive gases has been described by Goodyear in U.S. Pat. Nos. 6,315,000 and 6,418,957. Goodyear describes the use of an eductor to capture and recover gases into a gas processing system. However, Goodyear does not teach or suggest the use of engine fuel gas for the eductor and for recovering fugitive gases to be introduced to the engine fuel. In contradistinction, the present embodiment describes the use of the eductor 790 for engine fuel delivery as well as being part of an engine control system. By replacing pressure regulators previously used to reduce feed gas pressure with an eductor, there is no need to recompress the gas leaving the eductor 790 at the reduced pressure.

Goodyear contemplates in the '957 patent that his eductor system does not use additional energy. See col 2, line 20. However, Goodyear does not include the additional energy required by the gas compressor to recompress the low pressure gas leaving the eductor to the higher pressure of the gas used by the eductor. In the present application, there is no need for gas recompression so no additional energy is required to collect the fugitive gases which is advantageous.

Figure 15:
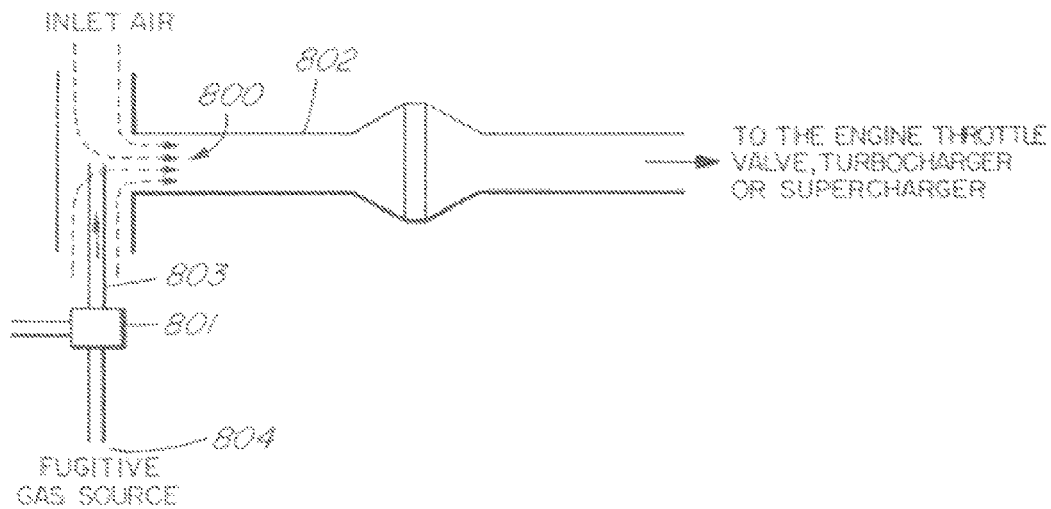
FIG. 15 is a diagrammatic view illustrating fugitive gas flow and inlet air when fugitive gas flow is generally steady.

Reference is now made to FIG. 15 wherein a further technique to control fugitive gas flow is illustrated. If the fugitive gas flow is known to be steady, the gases can be applied to a region near the air intake generally illustrated at 800. A diverter valve 801 may conveniently be used but is not necessary. With no diverter valve present and when the engine (not illustrated) is not running, the fugitive gases are vented to the atmosphere where the gases dissipate. The fugitive gases will generally not accumulate in the intake duct when the engine is not running. During engine startup, the inlet air flow is relatively small, so only small quantities of fugitive gases will be brought into the intake air. As the engine speed increases, the rate of air flow will also increase, causing most or all of the fugitive gases to be swept into the air duct 802. The optimum location for the fugitive gas pipe 803 may be determined by experimentation or by engineering approximations. Conveniently, if the flow of fugitive gases from the fugitive gas source 804 is relatively steady and not too great relative to the normal engine fuel, the usual engine throttle can maintain desired engine speed.

To enhance safety, a diverter valve 801 may be put into place to divert the fugitive gases well away from the engine air intake region 800 when the engine speed is below a specified value. The diverter valve 801 is conveniently an off/on type or a proportional type. If a continuous acting diverter valve is used, the fugitive gas flow to the intake 800 may be increased or decreased slowly enough to allow the engine governor to minimize RPM fluctuations in the engine caused by the change in fugitive flow.

In the event an off/on valve is used, the engine speed changes would possibly be too great. A feed-forward arrangement to decrease or increase the fuel or air-fuel valve setting for speed control to coincide with the arrival or disappearance of the fugitive gases is therefore contemplated.

Figure 16:
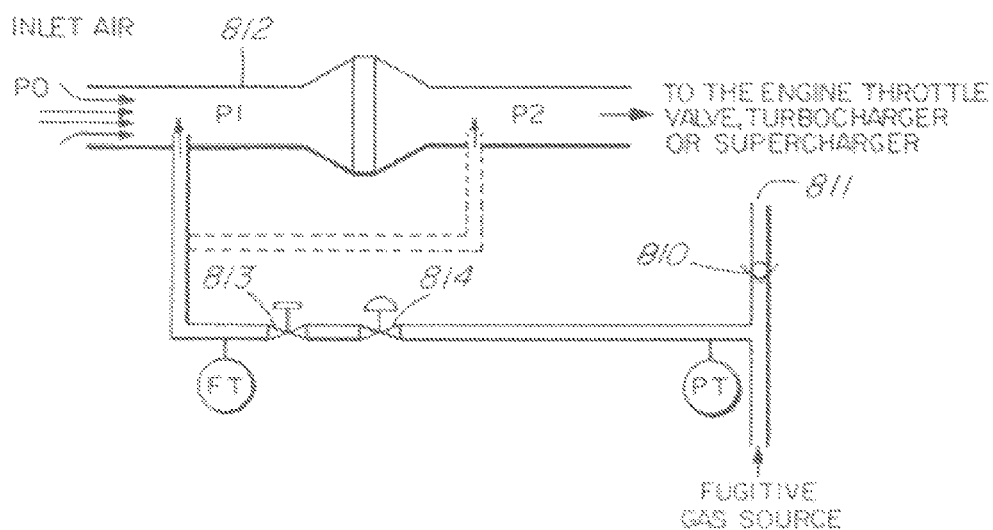
FIG. 16 is a view similar to FIG. 15 but illustrating a control system used for fugitive gas when the flow is unsteady.

If fugitive gas flow is known to be unsteady or might be unsteady, a control system such as that is illustrated in FIG. 16 is contemplated. In this embodiment, a low pressure check valve 810 is placed on the normal fugitive gas vent 811. The resulting pressure is sufficient to cause the fugitive gas to flow to the engine intake 812. A shut-off valve 813 is conveniently provided to terminate fugitive gas flow when the engine speed is below a specified value or such other conditions exist which may be safety related. If the fugitive gas flow is greater than the flow delivered to the engine intake 812, the check valve 810 will open to allow the excess gas to vent to the atmosphere. The pressure sensor 814 conveniently determines if the pressure is above the cracking pressure for the check valve 810.

Figure 17:
FIG. 17 illustrates a typical control using a proportion, integral, derivative (PID) algorithm.

Normally, a control loop will control the control valve 814 to maintain a pressure just below the cracking pressure of the check valve 810. If the pressure exceeds the desired set-point, the control valve 814 will open and if the pressure is below the desired set-point, the control valve 814 will close. A typical control with a proportion, integral, derivative (PID) algorithm is illustrated in FIG. 17.

In the event the fugitive gas flow changes rapidly, the fugitive flow change to the engine will produce an RPM upset before the governor can react to change the main fuel flow to maintain the set-point speed. To reduce the RPM upset, the fuel flow measurement signal can be used as a feed-forward signal to the engine fuel or speed control valve thereby causing the device controlling the fuel to the engine to open or close appropriately according to the flow of the fugitive gases. Such a system is illustrated diagrammatically in FIG. 18.

Figure 18:
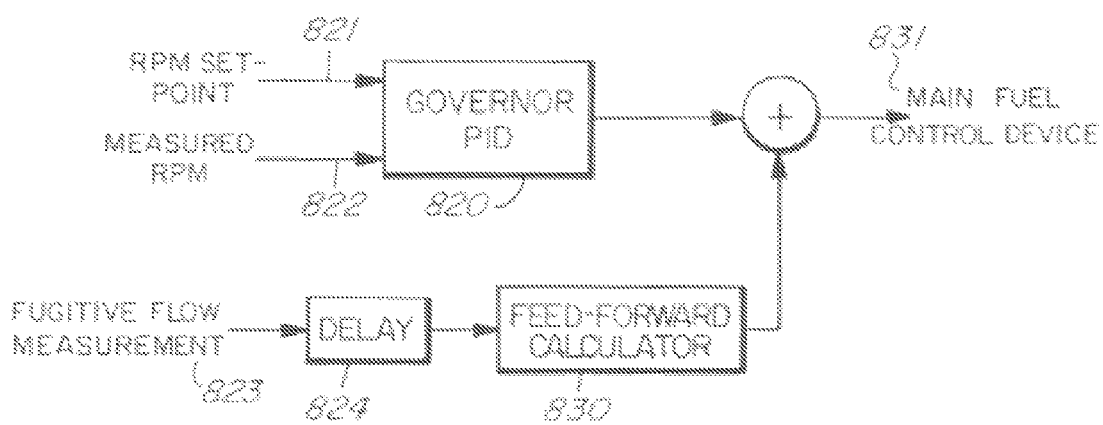
FIG. 18 illustrates a control system used with a governor feed forward when the fugitive gas flow changes rapidly and therefore has the possibility of changing engine RPM.

As shown in FIG. 18, the control algorithm, shown here as a PID 820, compares the RPM set-point 821 with the measured RPM 822 and produces an output based on the difference. The fugitive flow measurement signal 823 is delayed at 824, the delay being appropriate to the transit time between the addition of the fugitive gases and their arrival at the engine cylinders. An amount of feed-forward 830, which is related to the fuel flow amount, is then added to the output on the governor PID 820. When the fugitive flow increases, the feed-forward calculator 830 generates a negative output causing the main fuel control device 831 to close. The total fuel reaching the engine is therefore unchanged, even though the fugitive flow has increased. If the amount of fugitive flow decreases, the feed-forward calculator 830 will generate an output to compensate accordingly.

Figure 19:
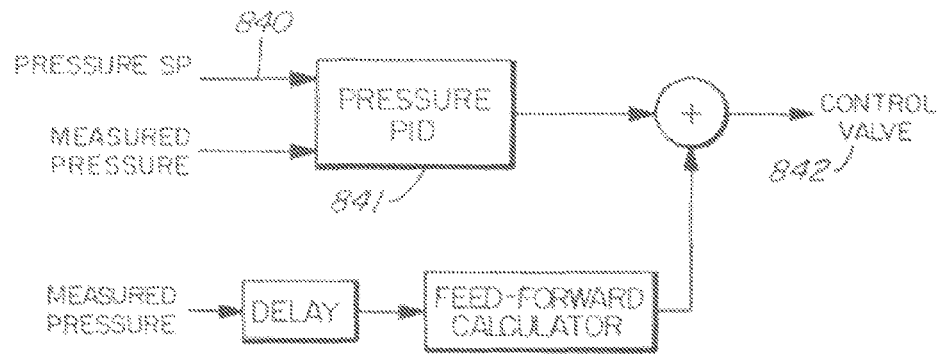
FIG. 19 illustrates a control system used for unsteady fugitive gas flow where control of a fuel valve with feed-forward is not desired.

The fugitive flow measurement may be made directly or calculated from the measured pressure and the valve open position using well-known formulas for calculating flow from the valve characteristics and the pressure. The general form of the formula is:

$$Q = Cv * P1 * K * (\Delta P/P1 * T))0.5$$

Where Q is the gas flow rate;
Cv is the valve flow coefficient, which is of the valve open fraction;
$\Delta P$ is the pressure difference across the valve;
P1 is the absolute pressure of the gas before the valve;
T is the absolute temperature of the gas; and
K is a factor that depends on the units, valve fittings, gas specific gravity and the like If the flow is known to be unsteady, and control of the fuel valve with feed-forward is not desired or possible, then the fugitive control may be configured to reduce the rate of change of the gaseous fugitive flow as seen in FIG. 19. A pressure signal 840 is fed to a pressure PID 841 and the pressure signal is also converted to a correction to the valve output. In this case, a rapid increase of the pressure signal 840 will cause the main fuel control valve 842 to close a specified amount, thereby minimizing any rapid flow upsets.

Figure 20:
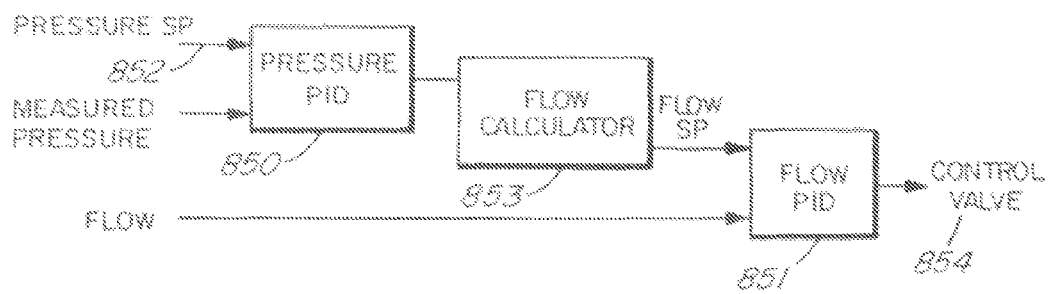
FIG. 20 illustrates a cascade control associated with a pressure PID and a flow PID having quick response.

If there is unsteady fugitive gas flow with cascade control, a pressure PID 850 is utilised with slow response in series with a flow PID 851 having a fast response as illustrated in FIG. 20.

In this system, the pressure PID 850 is set to give a relatively slow response to input changes. When the pressure is less than the SP 852, the output of the PID 850 will increase. From the pressure and the flow coefficient, Cv, corresponding to the valve fractional opening a desired flow is calculated using the expression described previously, or by a similar expression for calculating flow. The maximum flow is set according to the engine size or the maximum amount of fuel which will be displaced by the fugitive gases.

The calculated flow 853 used as a set-point is compared to the actual flow in the flow PID 851 where the response is relatively rapid. If the actual flow is greater than the flow set-point, the output of the flow PID 851 will decrease to close the flow control valve 854. In this way, the valve 854 can respond rapidly to short-term pressure upsets and respond to minimize the venting of fugitive gases. The flow can be measured with a flow sensor or calculated from the measured pressure and the position of the control valve 854 in order to allow a rapid response to changing fugitive gas conditions.

Figures 21A, 21B:
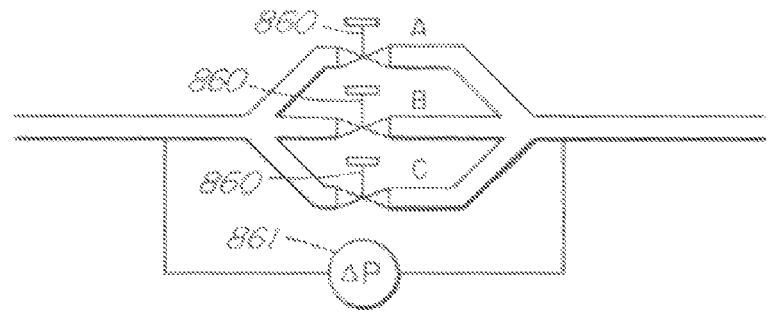
FIG. 21A is a diagrammatic illustration of a flow control using solenoid valves in parallel association.
FIG. 21B is a chart which illustrates the various flow rates used with a combination of solenoid openings and closings.

In place of a control valve 854 of FIG. 20, the flow may be controlled by a number of solenoid valves 860 in parallel, where orifices control the flow across each of the solenoid valves as is illustrated in FIGS. 21A and 21B. By sizing the orifices appropriately, the total flow can be controlled according to the number of solenoid valves 860 which are open.

Flow control using the three solenoid valves 860 and orifice combinations are labeled A, B, and C in FIGS. 21A and 21B. The orifices are sized so that the flow of Orifice A is about fifty percent (50%) of the flow in orifice B which, in turn, is about fifty percent (50%) of the flow in orifice C. The total flow through the orifices at the expected pressure difference should then be the maximum flow desired by the system. A combination of valve openings and closings can control the flow to eight (8) different values as is illustrated by the table of FIG. 21B.

In a similar manner, by selection of orifice sizes and number of parallel legs, the flow can be controlled in steps of the desired size. The fugitive flow controller can read the pressure across the solenoids as at 861 (FIG. 21A) and control the flow to the desired value, using the relationship between flow and pressure difference across an orifice. Control arrangements previously described can be used to provide the desired response. The solenoid arrangement of FIGS. 21A and 21B is advantageous when a faster response is desired than is possible with a control valve.

Figure 22A:
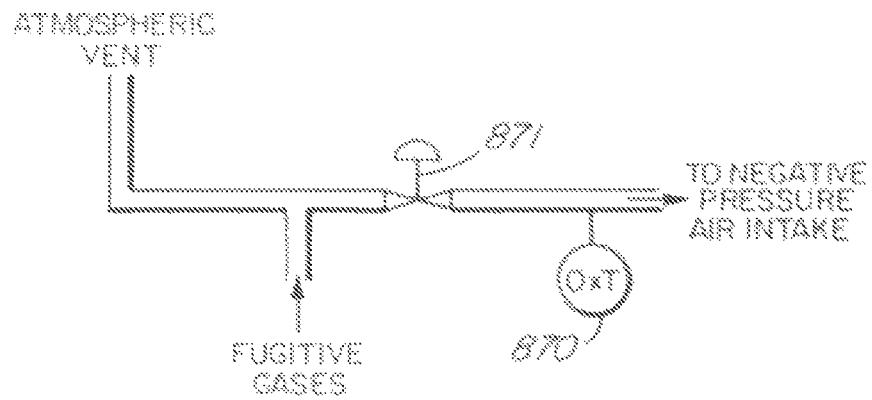
FIG. 22A illustrates a control system used for fugitive gases diluted with air which control system is intended to reduce rapid changes to the quantity of fugitive gases supplied to the engine intake.
Figure 22B:
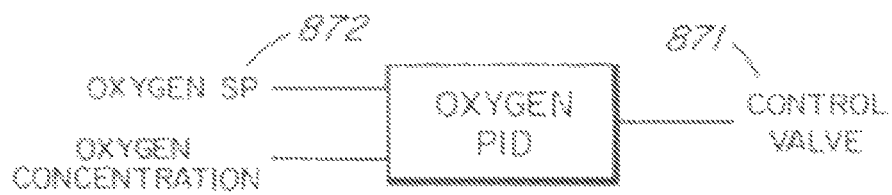
FIG. 22B illustrates an oxygen PID used to adjust the opening and closing of a control valve controlling the quantity of fugitive gases supplied to an engine.

When the fugitive gases are diluted with air, the fraction of air is generally unknown. Further, if the fraction of air changes rapidly, the change can cause a short-term RPM excursion. A control arrangement as is shown in FIGS. 22A and 22B is advantageous to minimize rapid changes to the amount of combustible vapors supplied to the air intake. OxT is conveniently an oxygen measurement device 870 as is illustrated in FIGS. 22A and 22B although a nitrogen or hydrocarbon measurement device may advantageously also be used.

When the valve 871 is closed, the oxygen sensor 870 will measure a relatively high value, equal to or approaching the normal oxygen concentration in air. To initiate flow, the valve 871 must be opened by an amount sufficient to start a small flow used to displace air. Then, oxygen control set point 872 (FIG. 22B) will be at a higher value, so that the PID control system will cause the control valve 871 to open, drawing some more of the fugitive gases to the engine. As the flow increases, some air from the atmospheric vent will be drawn past the control valve 871. When the oxygen percentage from this air reaches the PID set point, the control PID will regulate the valve 871 to maintain the desired percentage of air. If the oxygen SP 872 is relatively low, say 1%, then a rapid increase in fugitive gas flow will be largely vented to the atmosphere until the control loop causes the valve 871 to open, increasing the flow to the engine. Since the normal amount of air in the flow to the engine is relatively small, any upset to the engine will likewise be small.

As earlier set forth, the sensor can be sensitive to oxygen, nitrogen or combustible gases. With a combustible gas sensor, the direction of action of the PID controller would be opposite in sign and a strategy for starting from a no-flow condition would not be required. The gas sensor could also be placed before the control valve with minor changes to the control strategy.

Figure 23:
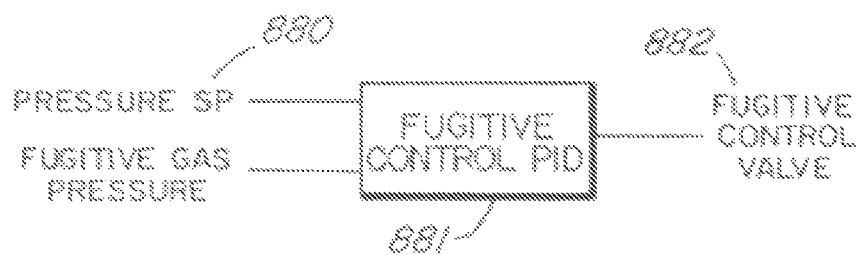
FIG. 23 illustrates a control used for an eductor which control uses pressure sensors and pressure set points.

For use with an eductor, the eductor must be sized appropriately according to the fuel consumption of the engine. Reference is again made to FIG. 14B. The pressure of the fugitive gas is measured by the pressure sensor 794. This pressure is dependent on the check valve (not illustrated) and the flow of the fugitive gases. The controller ensures that the fugitive control valve 795 can open only if the pressure at 796 is less than the pressure at 794. If this condition is met and the pressure at 794 is greater than the pressure set point 880 (FIG. 23), the control PID 881 will open the fugitive control valve 882 to allow fugitive gases to be added to the engine fuel. If pressure at 796 rises above the fugitive gas pressure measured at 794, the valve 882 will close, causing the fugitive gas to be vented to the atmosphere through the check valve.

If there is no automatic air fuel ratio control, then the addition of fugitive combustible gases to the intake air can affect the air-fuel ratio. A control system is therefore required to ensure the correct air-fuel ratio is maintained with the addition of fugitive gases other than when an eductor is used to bring the fugitives into the main engine fuel supply as has been described.

The use of air fuel ratio control with an exhaust oxygen sensor does not distinguish the source of the combustible vapors. Existing air-fuel ratio control systems that use an exhaust oxygen sensor will therefore not require significant modification.

Certain prior art systems use engine fuel flow and other parameters to determine the required amount of air for the desired air to fuel ratio. For such systems, a fugitive flow measurement or calculation is required. The calculated flow may then be added to the measurement of the main engine fuel flow to ensure there is no upset to the air-fuel ratio as the amount of fugitive flow increases or decreases.

The fugitive flow measurement is required for control purposes and to estimate the result of combusting the fugitives instead of directly venting them to the atmosphere by way of a vent or by way of a flare stack. The fugitive gases may also be measured with a flow measurement device.

When fugitive gases are mixed with air, the measurement of the quantity of fugitives, which might be required for an estimate of emissions, cannot be obtained with a flow meter only. A flow meter used with the oxygen (or nitrogen or combustible vapors) percentage in the gas flowing to the engine may be used to calculate the fugitive quantity when the composition of the fugitive gas and air is known.

An alternative method, if main fuel flow is measured, is to periodically turn the fugitive flow off and on while measuring the difference in the main engine fuel flow. While this method works best when the engine load is steady during the measurement period, a more complex technique where the engine load, or associated parameters, is monitored during the switching of the fugitive flow to compensate for changes to the engine fuel consumption.

Many further modifications will readily occur to those skilled in the art to which the invention relates and the specific embodiments herein described should be taken as illustrative of the invention only and not as limiting its scope as defined in accordance with the accompanying claims.

I claim:

1. A method of providing fugitive gases to a natural gas engine, said natural gas engine having a principal source of fuel and a secondary source of fuel which secondary source of fuel is different from said principal source of fuel, an air supply for providing air to said natural gas engine and an engine intake associated with said engine, said engine further having a throttle associated with said natural gas engine, said fugitive gases being introduced upstream of said throttle of said engine and downstream of an air filter mounted on said air supply, said method comprising positioning said air filter on said engine intake of said engine, allowing said air filter to create a negative pressure in said engine intake downstream of said air filter and upstream of said throttle sufficient to allow said fugitive gases to enter said engine intake and allowing said fugitive gases to be collected by said negative pressure in said engine intake downstream of said air filter and upstream of said throttle.

* * * * *